United States Patent
Ohno

(10) Patent No.: US 7,307,929 B2
(45) Date of Patent: Dec. 11, 2007

(54) METHOD AND APPARATUS FOR TILT CORRECTION AND OPTICAL DISK RECORDER/PLAYER USING TILT CORRECTION TECHNIQUE

(75) Inventor: Takehide Ohno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 751 days.

(21) Appl. No.: 10/767,070

(22) Filed: Jan. 30, 2004

(65) Prior Publication Data

US 2004/0257930 A1 Dec. 23, 2004

(30) Foreign Application Priority Data

Jan. 31, 2003 (JP) ............................. 2003-024159

(51) Int. Cl.
*G11B 7/095* (2006.01)
(52) U.S. Cl. .............................. 369/44.32; 369/53.19
(58) Field of Classification Search .............. 369/44.32, 369/53.19
See application file for complete search history.

(56) References Cited

U.S. PATENT DOCUMENTS 6,459,664 B1 10/2002 Yamada et al.
7,196,991 B2 * 3/2007 Nagaoka et al. ......... 369/53.19
2002/0060964 A1 5/2002 Park
2003/0179665 A1 9/2003 Iwazawa et al.

FOREIGN PATENT DOCUMENTS

| EP | 1 213 712 | 6/2002 |
| JP | 2001-52362 | 2/2001 |
| JP | 2002-25090 | 1/2002 |

* cited by examiner

*Primary Examiner*—Wayne Young
*Assistant Examiner*—Vanessa Coleman
(74) *Attorney, Agent, or Firm*—Dickstein Shapiro LLP

(57) ABSTRACT

In a tilt correction method, first information about a specific inclination of an object lens is acquired in response to an access request to an information recording medium. The specific inclination is obtained when the signal characteristic of a push-pull signal becomes a prescribed level in or near a target access area. Then, second information about the optimum inclination of the object lens is acquired for the target access area, based on the first information and tilt difference information representing a difference between a first inclination and a second inclination of the object lens defined in advance in a particular area on the information recording medium. The first inclination corresponds to an optimum reproduced signal from the particular area, and the second inclination is obtained when the signal characteristic of the push-pull signal from the particular area becomes the prescribed level. Finally, tilt correction information is estimated from the second information.

14 Claims, 14 Drawing Sheets

METHOD AND APPARATUS FOR TILT CORRECTION AND OPTICAL DISK RECORDER/PLAYER USING TILT CORRECTION TECHNIQUE

BACKGROUND OF THE INVENTION

1. Field of the Invention

The present invention generally relates to tilt correction for an object lens relative to an information recording medium in an optical disk recorder/player, and more particularly, to a method and apparatus for correcting a tilt relative to an information recording medium and to an optical disk recorder/player using such a tilt correcting technique.

2. Description of Related Art

With an optical disk apparatus (i.e., an optical disk recorder/player), a laser beam is guided onto the recording side of an information recording medium, such as an optical disk, to record information. The recorded information is reproduced based on the light reflected from the recording side. In general, the optical disk apparatus is provided with an optical pickup device, which emits a laser beam to form a light spot on the recording side of the information recording medium, as well as receiving light reflected from the recording side.

Generally, an optical pickup device has an optical system including an object lens, which guides a laser beam emitted from a light source onto the recording side of the optical recording medium and guides return light flux reflected from the recording side to a prescribed light-receiving position. The optical pickup device also has a light receiving element arranged at the light-receiving position to receive the return light flux. The light receiving element outputs not only information reproduced from the data recorded in the recording side of the medium, but also signals containing servo information required for positioning of the object lens and the optical pickup device itself.

In recent years and continuing, the recording density in information recording media is increasing in response to demand for increased recording capacities of information recording media. In order to increase the recording density, the diameter of the light spot formed on the recording plane has to be decreased. To achieve this, use of an object lens with a large numerical aperture is becoming popular. However, as the numerical aperture increases, influence of wavefront aberration due to offset of the optical axis of the object lens from the line perpendicular to the recording plane also increases. The offset of the optical axis of the object lens is referred to as "tilt", which is likely to cause deformation of the light spot, as well as degradation of signals output from the light receiving element and containing reproduced information and servo information.

In general, information recording media are resin molded products, and most of the information recording media are fabricated by injection molding or similar techniques from the standpoint of productivity. In injection molding, molten resin is injected into a molding die having a cavity corresponding to the shape of the product to be molded, under pressure. If the product to be molded is a disk, such as an information recording medium, a radial flow type molding die having a direct gate (or an injection port) at the center of the cavity (corresponding to the rotational center of the information recording medium) is typically used. The molten resin injected through the direct gate flows from the center of the cavity toward the periphery. Because the temperature and the cooling rate of the resin injected into the cavity are non-uniform, internal stress is created and remains in the molded product. As a result, the resin density of the molded product becomes uneven. Consequently, the surface of the information recording medium is likely to become uneven. When such an information recording medium with an uneven recording plane is used, influence of wavefront aberration due to the tilt of the object lens varies depending on the location on the information recording medium.

To avoid the fluctuating frontwave aberration, various methods and apparatuses for correcting tilt have been proposed. For example, JPA 2001-52362 discloses a tilt servo apparatus, in which tilt correction is carried out for the data recorded area such that the amplitude of an RF signal becomes the maximum, while for the non-recorded area tilt correction is carried out such that the offset in the push pull parameter for detection of track error signals (hereinafter referred to as the "push-pull signal" for convenience) becomes substantially zero because RF signals cannot be acquired from the area in which no data are recorded.

Another publication JPA 2002-25090 discloses an optical disk apparatus, in which tilt correction is carried out such that the offset in the push-pull signal becomes substantially zero, or that the amplitude of the push-pull signal (which is referred to as the "traverse signal" in JPA 2002-25090) in traversing the track becomes the maximum.

In general, optical disk apparatuses are designed so that the tilt becomes substantially zero when the offset in the push-pull signal is zero or the amplitude of the push-pull signal in traversing the track is the maximum, in order to acquire the optimum reproduced signal. However, depending on the precision of the manufacturing equipment, the optical system of the optical pickup device is assembled at a position offset from the correct assembling position. In this case, even if the amount of the positional offset is within the acceptable range, the tilt may not be reduced to zero when the offset of the push-pull signal is zero or when the amplitude of the push-pull signal in traversing the track is the maximum. In other words, optimum tilt correction cannot be performed using the push-pull signal when the assembling precision varies.

SUMMARY OF THE INVENTION

The present invention was conceived in view of the above-described problem in the prior art, and it is an object of the present invention to provide a method and apparatus for tilt correction that can correct the inclination of the object lens relative to an information recording medium precisely even for the non-recorded area.

It is another object of the present invention to provide an optical disk apparatus that allows stable and reliable access to the information recording medium.

To achieve the objects, in one aspect of the invention, a tilt correction method for correcting an inclination of an object lens relative to an information recording medium in an optical disk apparatus, in which the object lens is used to concentrate a light beam onto a recording side of the information recording medium and collect a reflected beam from the recording side, is provided. The method comprises the steps of:

(a) acquiring first information about a specific inclination of the object lens in response to an access request to the information recording medium, the specific inclination corresponding to one obtained when a signal characteristic of a push-pull signal extracted for track error detection from the reflected beam becomes a prescribed level in or near a target access area;

(b) acquiring second information about the optimum inclination of the object lens for the target access area, based on the first information and tilt difference information representing a difference between a first inclination and a second inclination of the object lens defined in advance in a particular area on the information recording medium, the first inclination corresponding to an optimum reproduced signal from said particular area, and the second inclination being obtained when the signal characteristic of the push-pull signal from said particular area becomes the prescribed level; and (c) acquiring tilt correction information for correcting the inclination of the object lens based on the second information.

In this context, the term "information about inclination" includes not only an inclination itself, but also information that varies according to the change in inclination, information that can be converted to an inclination, and signal information for controlling the inclination of the object lens. Similarly, the term "tilt correction information" includes not only the quantity of correction for the lens inclination, but also information that can be converted to the quantity of correction.

With this method, the information about the optimum inclination of the object lens can be estimated for the target access area at high precision, without requiring a reproduced signal from the target access area. Accordingly, the inclination of the object lens relative to the information recording medium can be corrected precisely even for a non-recorded area in which no data have been recorded and therefore no reproduced signals are acquired.

The signal characteristic of the push-pull signal is, for example, the amplitude, and said specific inclination and the second inclination are obtained when the amplitude of the push-pull signal becomes substantially the maximum.

The first inclination, which is defined in advance corresponding to the optimum reproduced signal, is obtained when amplitude of an RF signal becomes substantially the maximum during reproduction of data in the particular area.

Alternatively, the first inclination is obtained when jitter becomes substantially the minimum during reproduction of data in the particular area.

This method may further comprise the step of adjusting the inclination of the object lens based on the tilt correction information.

In another aspect of the invention, a tilt correction apparatus used to correct an inclination of an object lens relative to an information recording medium for at least a recording operation for recording information in a recording side of the information recording medium is provided. The tilt correction apparatus comprises:

(a) first means for acquiring first information about a specific inclination of the object lens in response to an access request to the information recording medium, the specific inclination corresponding to one obtained when a signal characteristic of a push-pull signal extracted for track error detection from the reflected beam becomes a prescribed level in or near a target access area;

(b) second means for acquiring second information about the optimum inclination of the object lens for the target access area, based on the first information and tilt difference information representing a difference between a first inclination and a second inclination of the object lens defined in advance in a particular area on the information recording medium, the first inclination corresponding to an optimum reproduced signal from said particular area, and the second inclination being obtained when the signal characteristic of the push-pull signal from said particular area becomes said prescribed level; and (c) third means for correcting the inclination of the object lens based on the second information.

With this tilt correction apparatus, the information about the optimum inclination of the object lens can be estimated for the target access area at high precision, without requiring a reproduced signal from the target access area. Accordingly, the inclination of the object lens can be corrected precisely relative to the information recording medium even in an area in which no data are recorded and therefore no reproduced signal is acquired.

In still another aspect of the invention, an optical disk apparatus for performing at least recording of information in an information recording medium is provided. The optical disk apparatus comprises:

(a) a light source;
(b) an optical system including an object lens configured to guide light flux emitted from the light source onto a recording side of an information recording medium and to guide return light flux reflected from the recording side to a prescribed light receiving position;
(c) a photodetector located at the light receiving position;
(d) a controller that controls at least a recording operation for recording information in the information recording medium based on an output signal from the photodetector; and
(e) the above-described tilt correction device for correcting the inclination of the object lens for at least the recording operation.

With this optical disk apparatus, the inclination of the object lens can be corrected precisely relative to the information at least for the recording operation. Consequently, stable and reliable recording operations can be achieved. The tilt correction for the object lens can also be performed for reproducing and/or erasing information from the information recording medium.

The optical disk apparatus further comprises tilt difference information acquiring means that acquires the tilt difference information based on the output signal from the photodetector.

The tilt difference information acquiring means causes prescribed dummy data to be recorded in at least a portion of the recording side prior to acquiring the tilt difference information when no data are recorded on the recording side of the information recording medium.

The optical disk apparatus further comprises a memory for storing the tilt difference information.

The tilt difference information is acquired during at least one of the manufacturing process and the adjusting process of the optical disk apparatus.

BRIEF DESCRIPTION OF THE DRAWINGS

Other objects, features, and advantages of the present invention will become more apparent from the following detailed description when read in conjunction with the accompanying drawings, in which.

DETAILED DESCRIPTION OF THE INVENTION

Figure 1:
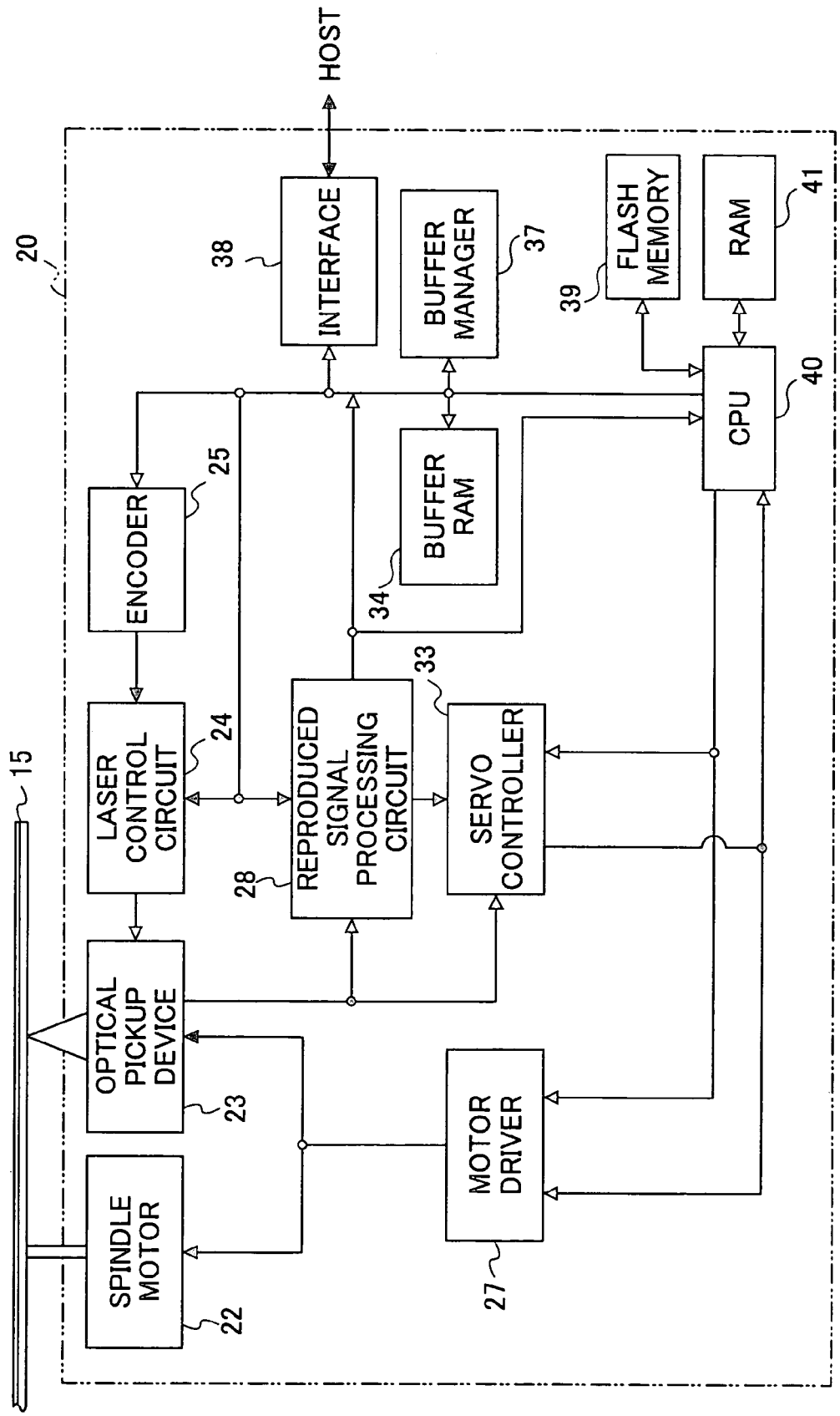
FIG. 1 is a block diagram of the optical disk apparatus according to an embodiment of the invention.

Tilt correction performed in an optical disk apparatus (i.e., an optical recorder/player) according to an embodiment of the invention is described below with reference to FIG. 1 through FIG. 8. FIG. 1 is a schematic block diagram of an optical disk apparatus according to an embodiment.

The optical disk apparatus 20 shown in FIG. 1 includes a spindle motor 22 for rotating an optical disk 15 (which is an example of an information recording medium), an optical pickup device 23, a laser control circuit 24, an encoder 25, a motor driver 27, a reproduced signal processing circuit 28, a servo controller 33, a buffer RAM 34, a buffer manager 37, an interface 38, a flash memory 39, a CPU 40, and a RAM 41. In FIG. 1, the arrows indicate typical signal flows or data flows, but are not intended to depict all the connections between the respective blocks. In this embodiment, an information recording medium conforming to the DVD (digital versatile disc) standard is used as the optical disk 15.

The optical pickup device 23 guides a laser beam onto a prescribed position on the recording side of the optical disk 15, in which spiral or concentric tracks are formed, and it receives the beam reflected from the recording side of the optical disk 15. The details of the optical pickup device 15 are described below.

Figure 2:
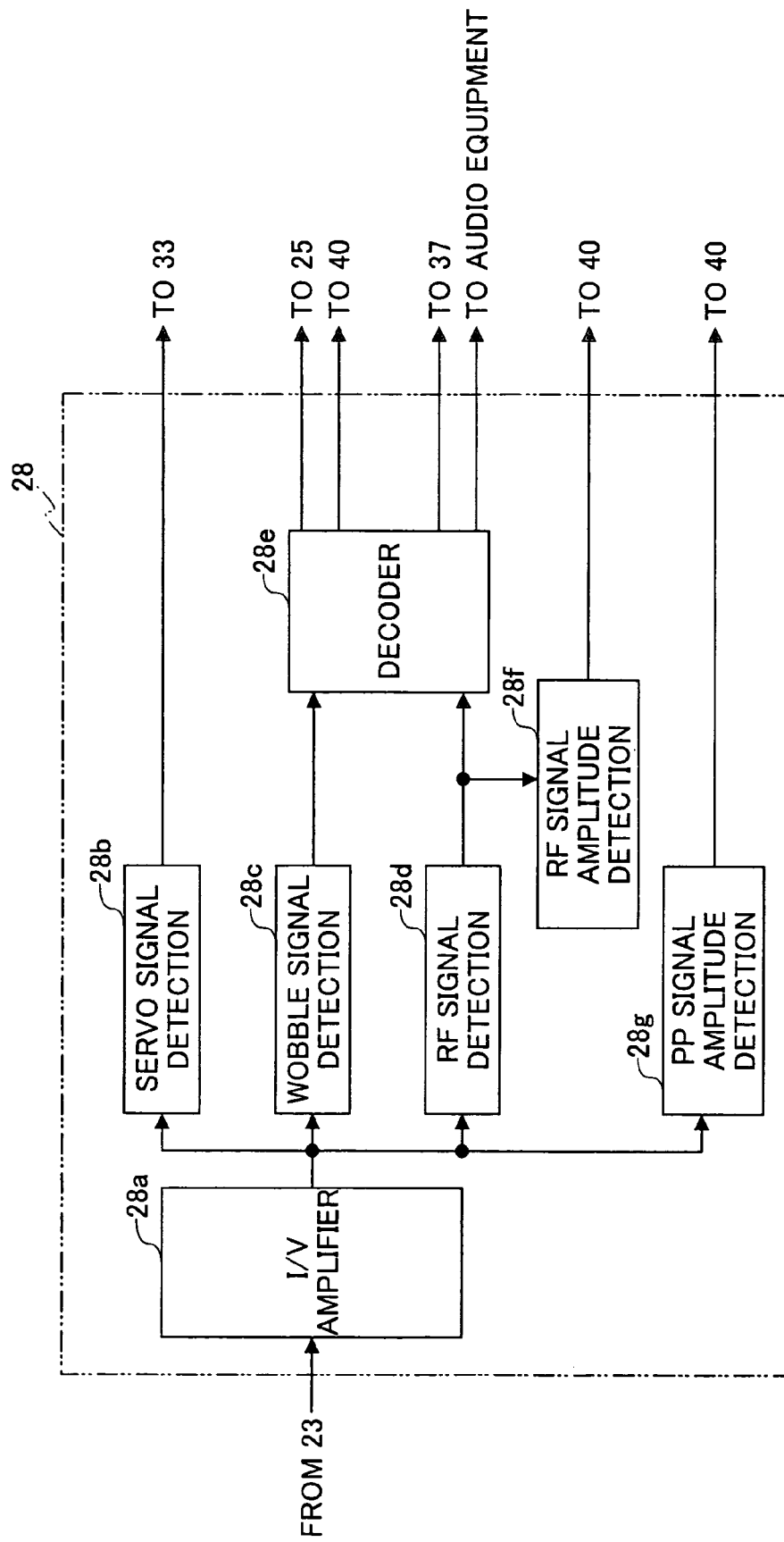
FIG. 2 is a block diagram of the reproduced signal processing circuit used in the optical disk apparatus shown in FIG. 1.

FIG. 2 illustrates the structure of the reproduced signal processing circuit 28. The reproduced signal processing circuit 28 includes an I/V amplifier 28a, a servo signal detection circuit 28b, a wobble signal detection circuit 28c, an RF signal detection circuit 28d, a decoder 28e, an RF signal amplitude detection circuit 28f, and a PP signal amplitude detection circuit 28g.

The I/V amplifier 28a converts the electric current signal output from the optical pickup device 23 to a voltage signal, and amplifies the voltage signal with a prescribed gain. The servo signal detection circuit 28b detects a servo signal (including a focus error signal and a track error signal), based on the output signal of the I/V amplifier 28a. The servo signal detected by the servo signal detection circuit 28b is output to the servo controller 33. The wobble signal detection circuit 28c detects a wobble signal, based on an output voltage of the I/V amplifier 28a. The decoder 28e extracts ADIP (Address In Pregroove) information and a synchronizing signal from the wobble signal detected by the wobble signal detection circuit 28c. The ADIP information extracted from the wobble signal is output to the CPU 40, while the synchronizing signal is output to the encoder 25. The decoder 28e also carries out signal processing and error correction on the RF signal detected by the RF signal detection circuit 28d, and then stores the decoded signal as reproduced data in the buffer RAM 34 via the buffer manager 37. If the reproduced data are music data, then the output signal of the decoder 28e is supplied to the external audio system.

The RF signal amplitude detection circuit 28f detects an amplitude of the RF signal detected by the RF signal detection circuit 28d, and outputs the RF amplitude to the CPU 40. The PP signal amplitude detection circuit 28g detects amplitude of the push-pull signal for track error signal detection based on the output voltage of the I/V amplifier 28a, and outputs the PP amplitude to the CPU 40.

Returning to FIG. 1, the servo controller 33 produces a control signal for correcting the focus offset, which is referred to as a "focus control signal", based on the focus error signal supplied from the reproduced signal processing circuit 28, and another control signal for correcting the track offset, which is referred to as a "tracking control signal"), based on the track error signal. These control signals are supplied from the servo controller 33 to the motor driver 27.

The motor driver 27 outputs a driving current according to the focus control signal from the servo controller 33, which is referred to as a "focus driving current", and a driving current according to the tracking control signal, which is referred to as a "tracking driving current", to the optical pickup device 23. The motor driver 27 also outputs a driving current according to a tilt control signal supplied form the CPU 40, which is referred to as a "tilt driving current", and a driving signal according to a seek control signal to the optical pickup device 23. The tilt control signal and the seek control signals are described below. The motor driver 27 further outputs a driving signal to the spindle motor 22 in response to an instruction from the CPU 40.

The buffer manager 37 manages input and output of data to and from the buffer RAM 34. When the amount of data accumulated in the buffer RAM 34 reaches a prescribed level, the buffer manager 37 reports it to the CPU 40.

The encoder 25 takes the data from the buffer RAM through the buffer manager 37 based on the instruction from the CPU 40, performs data modulation, and adds error correction codes to create data to be written in the optical disk 15. Furthermore, the encoder 25 outputs a writing signal to the laser control circuit 24 in synch with the synchronizing signal supplied from the reproduced signal processing circuit 28, based on the instructions from the CPU 40.

The laser control circuit 24 outputs a control signal for controlling output of the laser beam irradiating the optical disk 15, which is referred to as an "LD control signal", to the optical pickup device 23, based on the writing signal from the encoder 25 and the instruction from the CPU 40.

The interface 38 is a bi-directional communication interface with a host (a personal computer, for example), which is a standardized interface such as ATAPI (AT Attachment Packet Interface), SCSI (Small Computer System Interface), or USB (Universal Serial Bus).

The flash memory 39 stores a program described with codes interpretable by the CPU 40. The CPU 40 controls the operations of the above-described components according to the program stored in the flash memory 39, and temporarily saves a portion of data required for the execution of control in the RAM 41.

Figure 3:
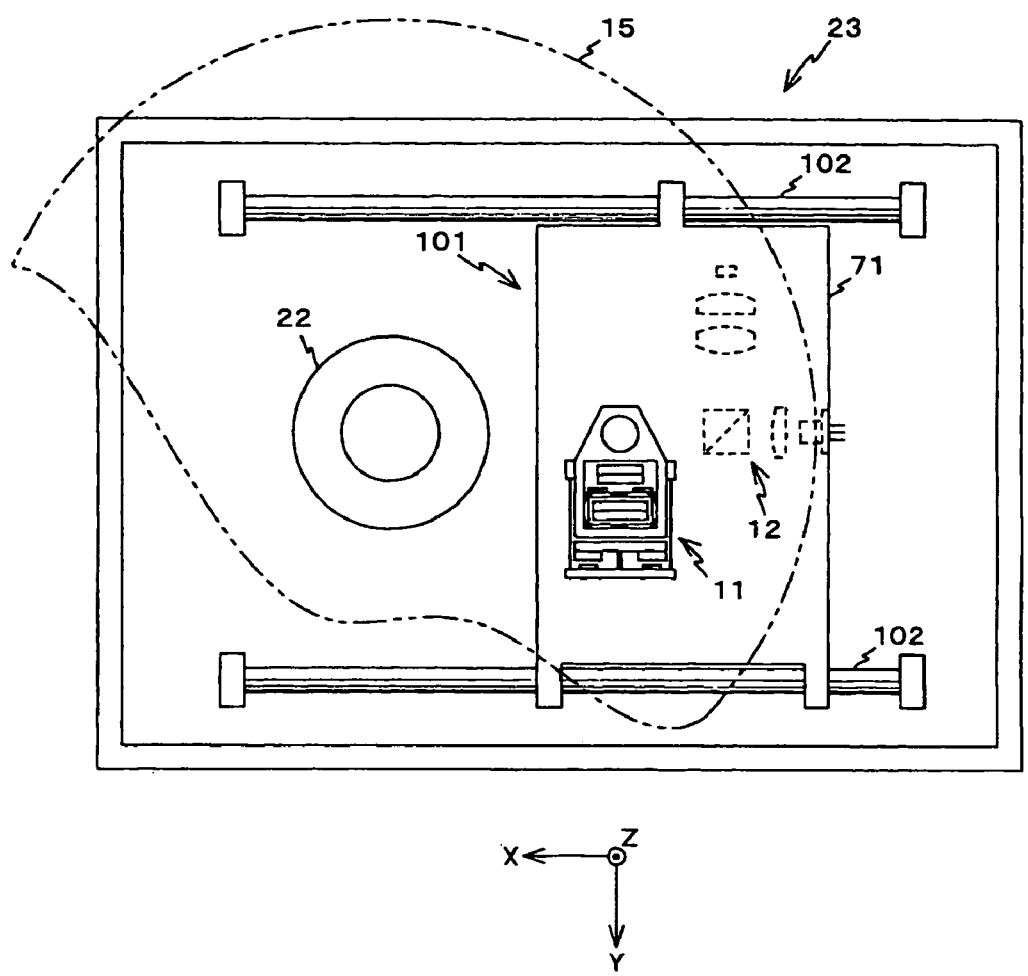
FIG. 3 is a plan view for explaining the structure of the optical pickup device used in the optical disk apparatus shown in FIG. 1.

Next, the optical pickup device 23 is explained with reference to FIG. 3 through FIG. 5. The optical pickup device 23 includes pickup core 101, which guides a laser beam onto the recording side of the optical disk 15 rotated by the spindle motor 22 and receives light flux reflected from the recording side of the optical disk 15. The optical pickup device 23 also includes a pair of seek rails 102 for guiding the motion of the pickup core 101 in the X direction, and a seek motor (not shown) for driving the pickup core 101 in the X direction.

The pickup core 101 has a housing 71, in which an light flux guiding optical system 12 for guiding light flux emitted from a light source toward the recording side of the optical disk 15 is accommodated. On the housing 71 is provided a condensing optical system 11 for condensing the light flux guided by the light flux guiding optical system 12 onto a prescribed position in the recording side of the optical disk 15.

Figure 4:
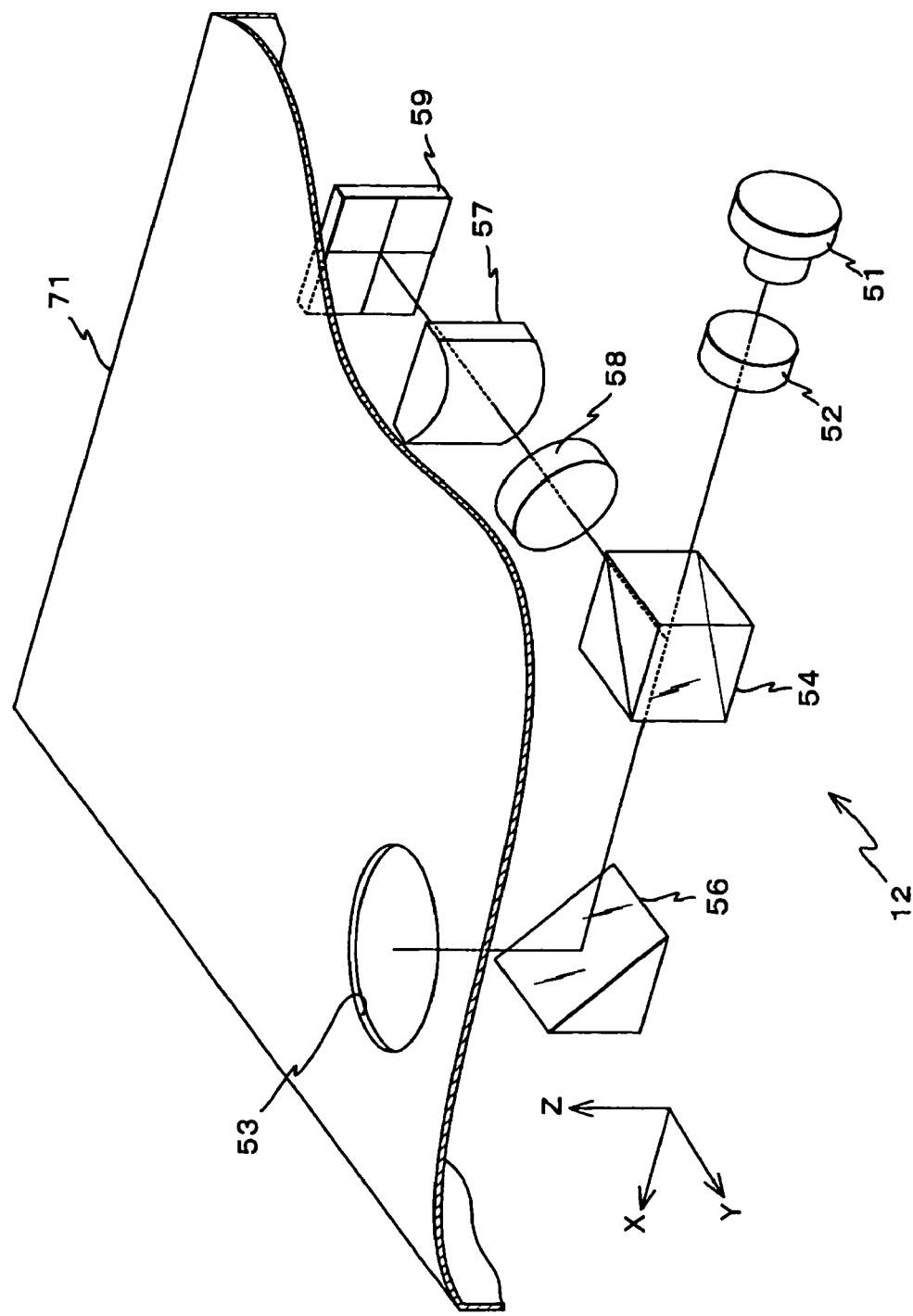
FIG. 4 is a perspective view illustrating the light flux guiding optical system used in the optical pickup device shown in FIG. 3.

As illustrated in FIG. 4, light flux guiding optical system 12 includes a light source unit 51, a coupling lens 52, a beam splitter 54, an upward reflecting mirror 56, a detection lens 58, a cylindrical lens 57, and a photodetector (or a light receiving unit) 59.

The light source unit 51 has a semiconductor laser (not shown) that emits light flux with wavelength of 660 nm, and is fixed to the inner wall of the housing 71 such that the maximum intensity light emitting direction of the light flux of the light source unit 51 becomes the positive X (+X) direction.

The coupling lens 52 is positioned on the +X side of the light source unit 51 to make the light flux emitted from the semiconductor laser 51a substantially parallel. The beam splitter 54 is positioned on the +X side of the coupling lens 52. The beam splitter 54 splits return light flux reflected from the recording side of the optical disk 15 into the negative Y (−Y) direction. The upward reflecting mirror 56 is positioned on the positive X (+X) side of the beam splitter 54 in order to change the maximum intensity light emitting direction of the light flux transmitted through the beam splitter 54 to the positive Z (+Z) direction. The light flux reflected upward by the upward reflecting mirror 56 is incident to the condensing optical system 11 through the opening 53 formed in the housing 71.

The detection lens 58 is positioned on the −Y side of the beam splitter 54 to collect the returned light flux having been split in the −Y direction by the beam splitter 54. The cylindrical lens 57 is positioned on the −Y side of the detection lens 58 to shape the return light flux collected by the detection lens 58. The photodetector 59 is positioned on the −Y side of the cylindrical lens 57, and receives the shaped return light flux at the light receiving plane. The photodetector 59 employs a quartered light receiving element, as in an ordinary optical disk apparatus. Each of the divided areas is referred to as a light receiving unit element for convenience, which outputs a signal representing the quantity of received light to the reproduced signal processing circuit 28. Thus, an optical path for guiding the light flux emitted from the semiconductor laser to the condensing optical system 11 and guiding the return light flux toward the photodetector 59 is formed inside the housing 71.

Figure 5A:
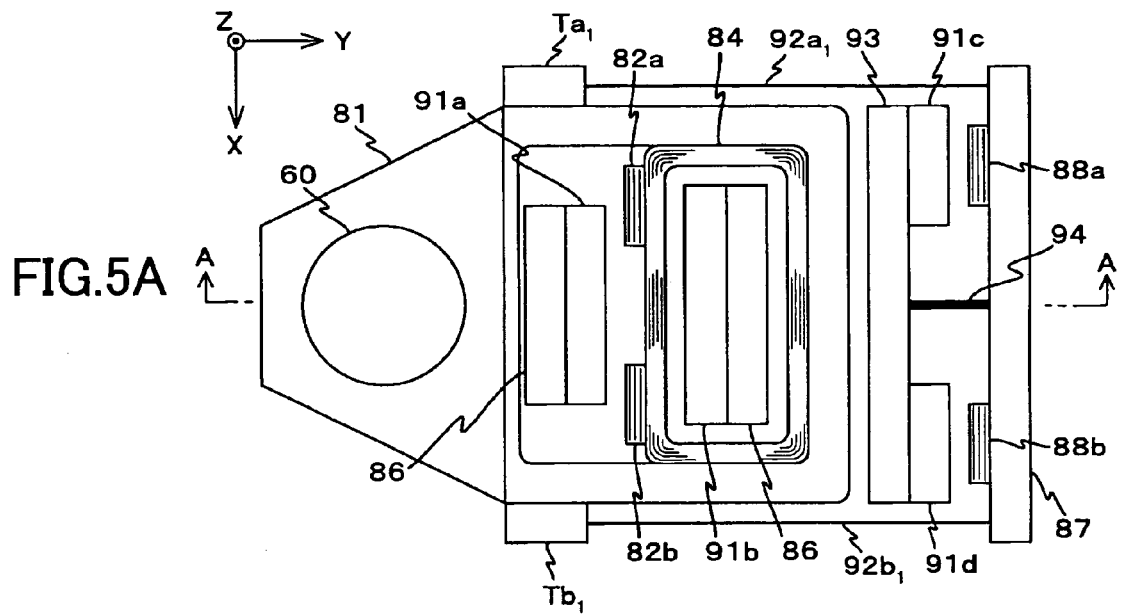
FIG. 5A is a plan view illustrating the condensing optical system used in the optical pickup device shown in FIG. 3.
Figure 5B:
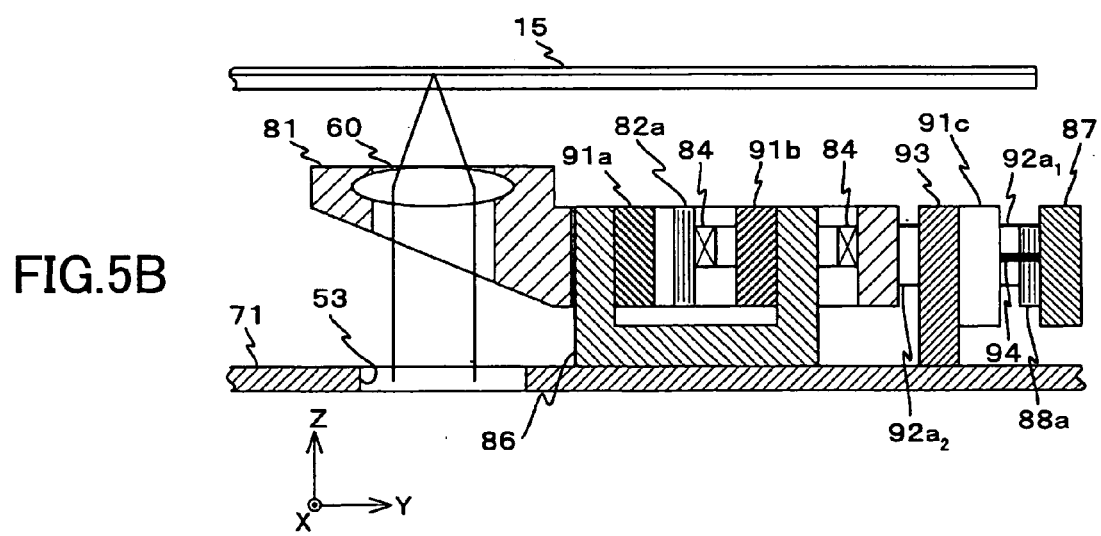
FIG. 5B is a cross-sectional view of the condensing optical system taken along the A-A line shown in FIG. 5A.

FIG. 5A and FIG. 5B illustrate the condensing optical system 11. FIG. 5B is a cross-sectional view taken along the A-A line show in FIG. 5A. The condensing optical system 11 includes an object lens 60, a lens holder 81 for holding the object lens 60, a first tracking coil 82$a$, a second tracking coil 82$b$, a focusing coil 84, a yoke 86, a first tilt coil 88$a$, a second tilt coil 88$b$, first through fourth permanent magnets 91$a$-91$d$, four conductive wire springs (denoted by 92$a_1$, 92$a_2$, 92$b_1$, and 92$b_2$), a wire spring fixing unit 87, a torsion spring 94, and a torsion spring fixing unit 93.

The wire spring fixing unit 87 can rotate within the X-Z plane, and has multiple output terminals and input terminals (not shown). Each of the input terminals is connected to one of multiple signal lines extended from the motor driver 27 to receive one of focus driving current, tracking driving current, tilt driving current, and other parameters.

The torsion spring fixing unit 93 is a plate, which is fixed to the housing 71 with its thickness direction consistent with the Y direction so as to face the wire spring fixing unit 87. The torsion spring fixing unit 93 holds the wire spring fixing unit 87 via the torsion spring 94. The third permanent magnet 91$c$ and the fourth permanent magnet 91$d$ are fixed to one surface of the torsion spring fixing unit 93 that faces the wire spring fixing unit 87 at predetermined positions. In the example shown in FIG. 5A, the third permanent magnet 91$c$ is positioned at one end on the −X side, and the fourth permanent magnet 91$d$ is positioned at the other end on the +X side.

The lens holder 81 is arranged such that the maximum intensity emitting direction of the light flux reflected by the upward reflecting mirror 56 toward the +Z direction is substantially consistent with the optical axis of the object lens 60. The first tracking coil 82$a$, the second tracking coil 82$b$, and the focusing coil 84 are fixed to the lens holder 81 at predetermined positions. Since the object lens 60, the lens holder 81, the tracking coils 82$a$, 82$b$, and the focusing coil 82 move together, these components are collectively referred to as a "movable part" for convenience.

The lens holder 81 is furnished with terminals Ta$_1$ and Ta$_2$ used to supply driving current to the tracking coils 82$a$ and 82$b$, respectively, as well as terminals Ta$_2$ and Tb$_2$ (not shown) used to supply driving current to the focusing coil 84. In this example, the terminals Ta$_1$ and Ta$_2$ are fixed to one side wall of the lens holder 81 located on the −X side, and the terminals Tb$_1$ and Tb$_2$ are fixed to the opposite side wall located on the +X side. The terminal Ta$_1$ is connected to one end of the wire spring 92$a_1$, and the terminal Ta$_2$ is connected to one end of the wire spring 92$a_2$. Similarly, the terminal Tb$_1$ is connected to one end of the wire spring 92$b_1$, and the terminal Tb$_2$ is connected to one end of the wire spring 92$b_2$ (not shown).

Each of the wire springs 92 extends in the Y direction, and the other end of each wire spring is coupled to a prescribed output terminal of the wire spring fixing unit 87 by soldering. Accordingly, the movable part is held elastically with respect to the wire spring fixing unit 87. When the wire spring fixing unit 87 rotates in the X-Z plane, the movable part also rotates together with the wire spring fixing unit 87.

The first tilt coil 88$a$ and the second tilt coil 88$b$ are fixed to one surface of the wire spring fixing unit 87 at prescribed positions, which surface faces the torsion spring fixing unit 93. The coil end of each of the tilt coils 88$a$ and 88$b$ is connected to a prescribed output terminal of the wire spring fixing unit 87. In this example, the tilt coils 88$a$ and 88$b$ have substantially the same shape. The first tilt coil 88$a$ faces the third permanent magnet 91c, while the second tilt coil 88b faces the fourth permanent magnet 91d, such that a rotational force is produced to rotate the wire spring fixing unit 87 within the X-Z plane when a driving current is supplied to the tilt coils 88a and 88b. The rotational direction can be controlled by regulating the direction of the driving current flowing through the tilt coils 88a and 88b. The size and the shape of each tilt coil may be selected in accordance with the required rotational force.

The yoke 86 has a U-shaped cross section with both ends located along the Y axis folded in the +Z direction. The yoke 86 is fixed to the housing 71 at a predetermined position. The first permanent magnet 91a and the second permanent magnet 91b are fixed to the inner faces of the yoke 86 so as to face each other along the Y axis.

The focusing coil 84 is wound around the second permanent magnet 91b and a portion of the yoke 86, so that a driving force is produced to drive the movable part either in the +Z direction or the −Z direction when a driving current is supplied. The driving direction of the movable part can be controlled by regulating the direction of the driving current flowing through the focusing coil 84. The size and the shape of the focusing coil 84 may be selected according to the required driving force.

The first tracking coil 82a and the second tracking coil 82b are positioned so as to face the first permanent magnet 91a, such that a driving force is produced to drive the movable part in the +X direction or the −X direction when a driving current is supplied. The driving direction can be controlled by regulating the direction of the driving current flowing through the first and second tracking coils 82a and 82b. The sizes and shapes of the first and second tracking coils 82a and 82b may be selected according to the required driving force.

Next, the operation of the above-described optical pickup device 23 is explained briefly. In this example, the optical pickup device 23 is loaded in the optical disk apparatus 20, such that the Z axis of the optical pickup device 23 is consistent with a direction perpendicular to the recording side of the optical disk 15, and that the Y axis is consistent with the tangential direction of the track. In other words, the X-axis direction is the tracking direction, and the Z-axis direction is the focusing direction.

<LD Control Signal>

The LD control signal output from the laser control circuit 24 is supplied to the light source unit 51, and light flux with an output level according to the LD control signal is emitted from the light source unit 51 in the +Z direction. The light flux is collimated by the coupling lens 52 into substantially parallel light, and strikes the beam splitter 54. The light flux having passed straight through the beam splitter 54 is reflected by the upward-reflecting mirror 56 to the +Z direction, and is incident on the condensing optical system 11 through the opening 53 of the housing 71. The light flux is concentrated onto the recording side of the optical disk 15 by the object lens 60 of the condensing optical system 11 to form a fine light spot thereon.

The return light flux reflected from the recording side of the optical disk 15 is shaped into substantially parallel light by the object lens 60, and is guided to the upward reflecting mirror 56 through the opening 53 of the housing 71. The return light flux is reflected by the upward reflecting mirror 56 in the −X direction, and incident on the beam splitter 54, which deflects the return light flux in the −Y direction. The return light flux having passed through the beam splitter 54 is received at the photodetector 59 via the detection lens 58 and the cylindrical lens 57. Each of the light receiving unit elements forming the photodetector 59 outputs an electric current signal corresponding to the quantity of the received light to the reproduced signal processing circuit 28.

<Focus Driving Current>

Focus driving current is supplied from the motor driver 27 to the prescribed input terminal of the wire spring fixing unit 87 of the condensing optical system 11, and is further supplied to the focusing coil 84 via the wire springs $92a_2$ and $92b_2$. According to the level and the direction of the focus driving current, the movable part of the condensing optical system 11 moves in the focusing direction to a desired degree.

<Tracking Driving Current>

Tracking driving current is supplied from the motor driver 27 to the prescribed input terminal of the wire spring fixing unit 87, and is further supplied to the tracking coils 82a and 82b via the respective wire springs $92a_1$ and $92b_1$. According to the level and the direction of the tracking driving current, the movable part of the condensing optical system 11 moves in the tracking direction to a desired degree.

<Tilt Driving Current>

Tilt driving current is supplied from the motor driver 27 to the prescribed input terminal of the wire spring fixing unit 87, and is further supplied to the tilt coils 88a and 88b. According to the level and the direction of the tracking driving current, the movable part of the condensing optical system 11 rotates within the X-Z plane.

Next, the process for acquiring tilt difference information, which is performed when the optical disk 15 is loaded in the above-described optical disk apparatus, is described with reference to FIG. 6 and FIG. 7. The flowchart shown in FIG. 6 corresponds to a sequence of an algorithm executed by the CPU 40. It is presumed that the optical disk 15 is a blank disk with no data recorded in the recording area.

First, in step 401, prescribed dummy data are recorded in a prescribed portion of the recording area. Then, in step 403, the loop counter value "i" is set to the initial value "1".

In step 405, tilt control signal $S_{tilt}$ is initialized to an initial value A1, and this control signal is output to the motor driver 27. The motor driver 27 outputs a tilt driving current corresponding to the tilt control signal $S_{tilt}$ to the optical pickup device 23, and consequently, the object lens 60 pivots in the X-Z plane. In this embodiment, the signal level of the tilt control signal $S_{tilt}$ is varied from the initial value A1 to Am by a stepsize of $\Delta a$ (where Am=A1+(m−1)*$\Delta a$, m≧2) over a range across a predetermined reference value.

Then, in step 407, the CPU 40 instructs the reproduced signal process circuit 28 to reproduce the dummy data recorded in the optical disk 15. In step 409, the amplitude of an RF signal (referred to simply as the "RF amplitude" for convenience) is acquired via the RF amplitude detection circuit 28f. The detected RF amplitude is saved in the RAM 41 in association with the corresponding tilt control signal $S_{tilt}$.

In step 411, the amplitude of a push-pull signal (referred to simply as the "PP amplitude") via the PP amplitude detection circuit 28g. The acquired PP amplitude is saved in the RAM 41 in association with the corresponding tilt control signal $S_{tilt}$.

Then, in step 413, it is determined whether the loop counter value "i" is greater than or equal to m (i≧m). Since loop counter value "i" has been set to "1", the determination result is negative and the process proceeds to step 415, in which the tilt control signal $S_{tilt}$ is updated by adding $\Delta a$ to the current tilt control signal $S_{tilt}$ ($S_{tilt}=S_{tilt}+\Delta a$). The updated value is output to the motor driver 27.

In step 417, the loop counter is incremented by 1, and the process returns to step 407. Steps 407 through 417 are repeated until the loop counter value "i" becomes m or greater. When the loop counter value reaches m, the determination result in step 413 is positive, and the process proceeds to step 419.

Figure 7A:
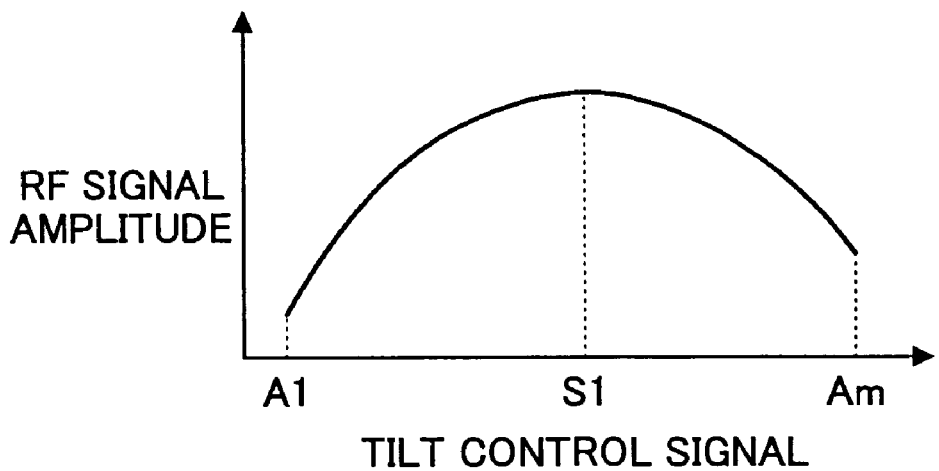
FIG. 7A is a graph of RF signal amplitude as a function of tilt control signal level.

In step 419, a tilt control signal (S1) that corresponds to the maximum of the RF amplitude is acquired, based on the relation between the measured RF amplitude and the associated tilt control signal $S_{tilt}$ stored in the RAM 41, as illustrated in FIG. 7A.

Figure 7B:
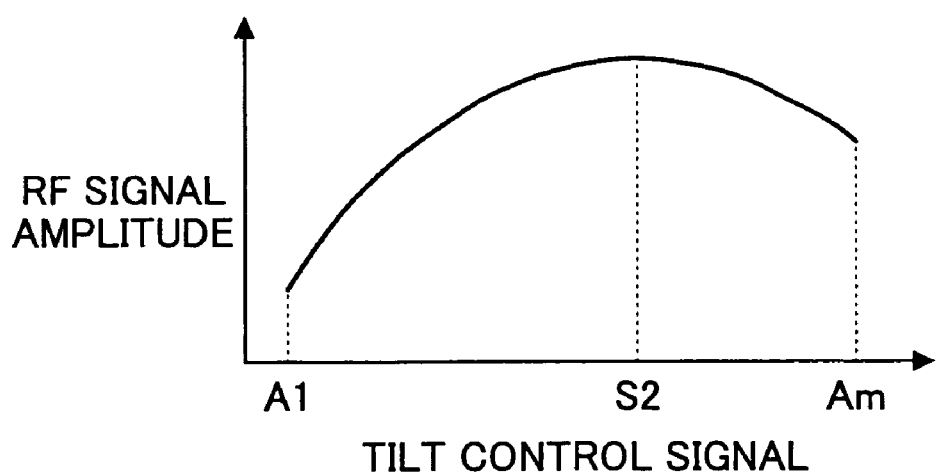
FIG. 7B is a graph of PP (push-pull) signal amplitude as a function of tilt control signal level.

In step 421, a tilt control signal (S2) that corresponds to the maximum of the PP amplitude is acquired, based on the relation between the measure PP amplitudes and the corresponding tilt control signal $S_{tilt}$ stored in the RAM 41, as illustrated in FIG. 7B.

In step 423, a difference Δs between the first tilt control signal S1 corresponding to the maximum RF amplitude and the second tilt control signal S2 corresponding to the maximum PP amplitude is calculated based on equation (1).

$$\Delta S = S1 - S2. \quad (1)$$

This Δs is referred to as a "tilt difference".

In step 425, the calculation result ΔS is saved in the flash memory 39 or the RAM 41, and the process terminates.

Next, the recording operation carried out by the optical disk apparatus when recording user data in the optical disk 15 is described. In response to a recording command supplied from the host apparatus, the CPU 40 outputs a control signal to the motor driver 27 to control the rotation of the spindle motor 22 based on a designated recording rate. At the same time, the CPU 40 reports the receipt of the recording command from the host to the reproduced signal processing circuit 28. The CPU 40 also instructs the buffer manager 37 to store the user data supplied from the host in buffer RAM 34.

When rotation of the optical disk 15 has reached a prescribed linear velocity, the reproduced signal processing circuit 28 detects a track error signal and a focus error signal based on the output signal from the photodetector 59. The detected track error signal and the focus error signal are supplied to the servo controller 33, which then corrects the track error and focus error. The track error correction and the focus error correction are performed whenever necessary during the recording operation. The reproduced signal processing circuit 28 acquires ADIP information based on the output signal from the photodetector 59 at prescribed timing until the recording operation is finished, and supplies the ADIP information to the CPU 40.

The CPU 40 outputs a seek control signal to the motor driver 27, based on the ADIP information, to control the seek motor so as to bring the optical pickup device 23 to the writing start position. When the CPU 40 receives a signal from the buffer manager 37 indicating that the amount of the user data accumulated in the buffer RAM 34 has exceeded the prescribed level, the CPU 40 instructs the encoder 25 to start generating a writing signal.

Figure 8:
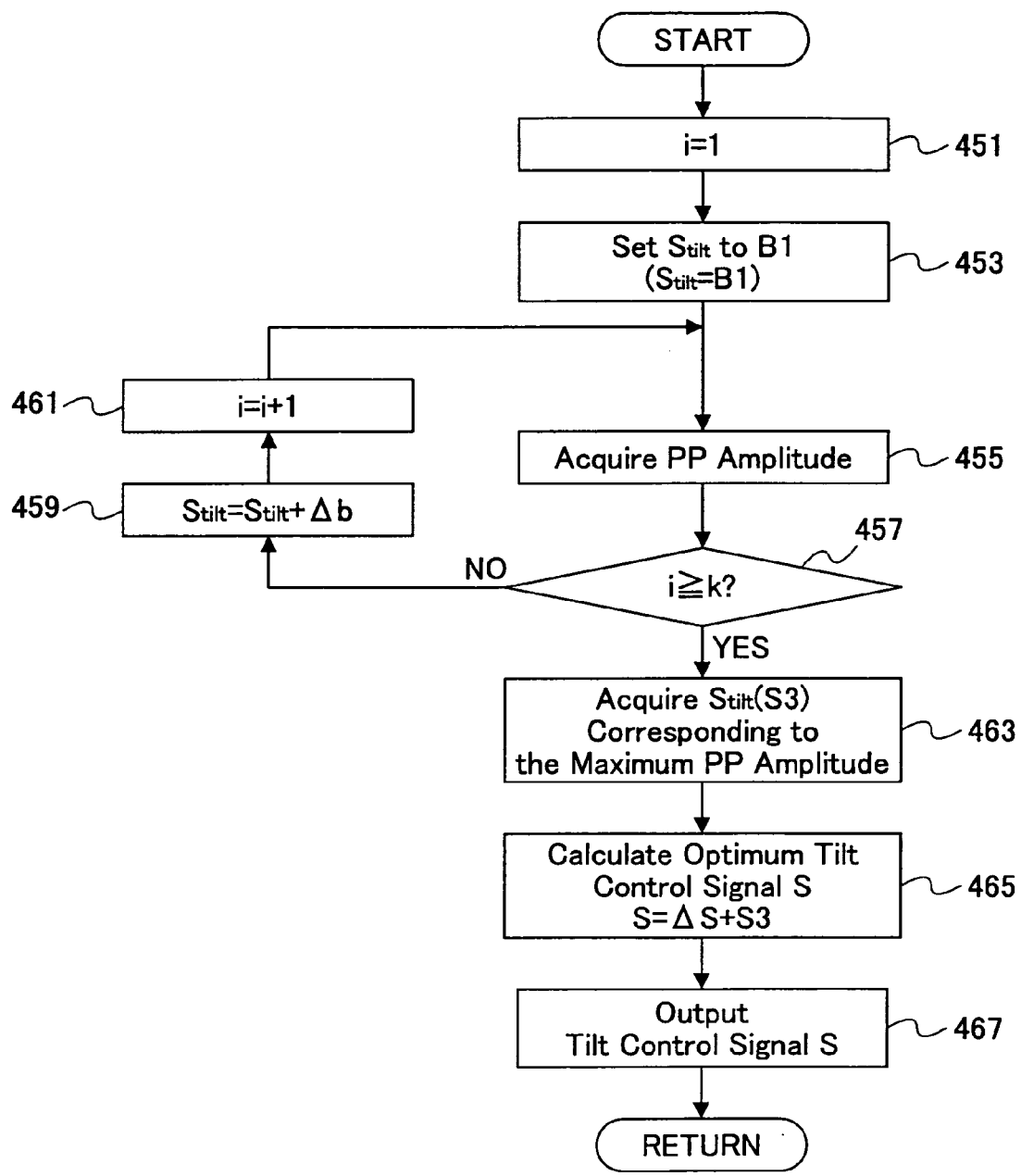
FIG. 8 is a flowchart of the operation for tilt correction.

When the optical pickup device 23 has been positioned at the writing start position, the CPU 40 starts the tilt correction process, which is described with reference to the flowchart shown in FIG. 8. In this embodiment, when the optical pickup device 23 has reached the writing start position, then the leading address of the sub routine corresponding to the flowchart of FIG. 8 is set to the program counter of the CPU 40.

First, in step 451, the loop counter value "i" is set to the initial value "1". In step 453, tilt control signal $S_{tilt}$ is initialized to the initial value B1, and this control signal is output to the motor driver 27. The motor driver 27 outputs a tilt driving current to the optical pickup device 23 in response to the tilt control signal $S_{tilt}$. In this embodiment, the signal level of the tilt control signal $S_{tilt}$ is varied from the initial value B1 to Bk by a stepsize of Δb (Bk=B1+(k−1)*Δb, k≧2) over a range across a prescribed reference value. The values of B1, Δb, and k may be same as A1, Δa, and m, respectively, used in the tilt difference detection shown in FIG. 6, or alternatively, these values may be different from the parameters shown in FIG. 6.

Then, in step 455, the amplitude of a push-pull signal (i.e., PP amplitude) is detected by the PP amplitude detection circuit 28g, and is saved in the RAM 41 in association with the corresponding tilt control signal $S_{tilt}$.

In step 457, it is determined whether the loop counter value "i" is greater than or equal to k. Since loop counter value "i" has been set to "1", the determination result is negative and the process proceeds to step 459, in which the tilt control signal $S_{tilt}$ is updated by adding Δb ($S_{tilt}=S_{tilt}+\Delta b$) The updated value is output to the motor driver 27.

In step 461, the loop counter is incremented by 1, and the process returns to step 455. Steps 455 through 461 are repeated until the loop counter value "i" becomes k or greater. When the loop counter value reaches k, the determination result in step 457 becomes positive, and the process proceeds to step 463.

In step 463, a tilt control signal (S3) that corresponds to the maximum of the PP amplitude is acquired, based on the relation between the measured PP amplitude and the associated tilt control signal $S_{tilt}$ stored in the RAM 41.

Figure 6:
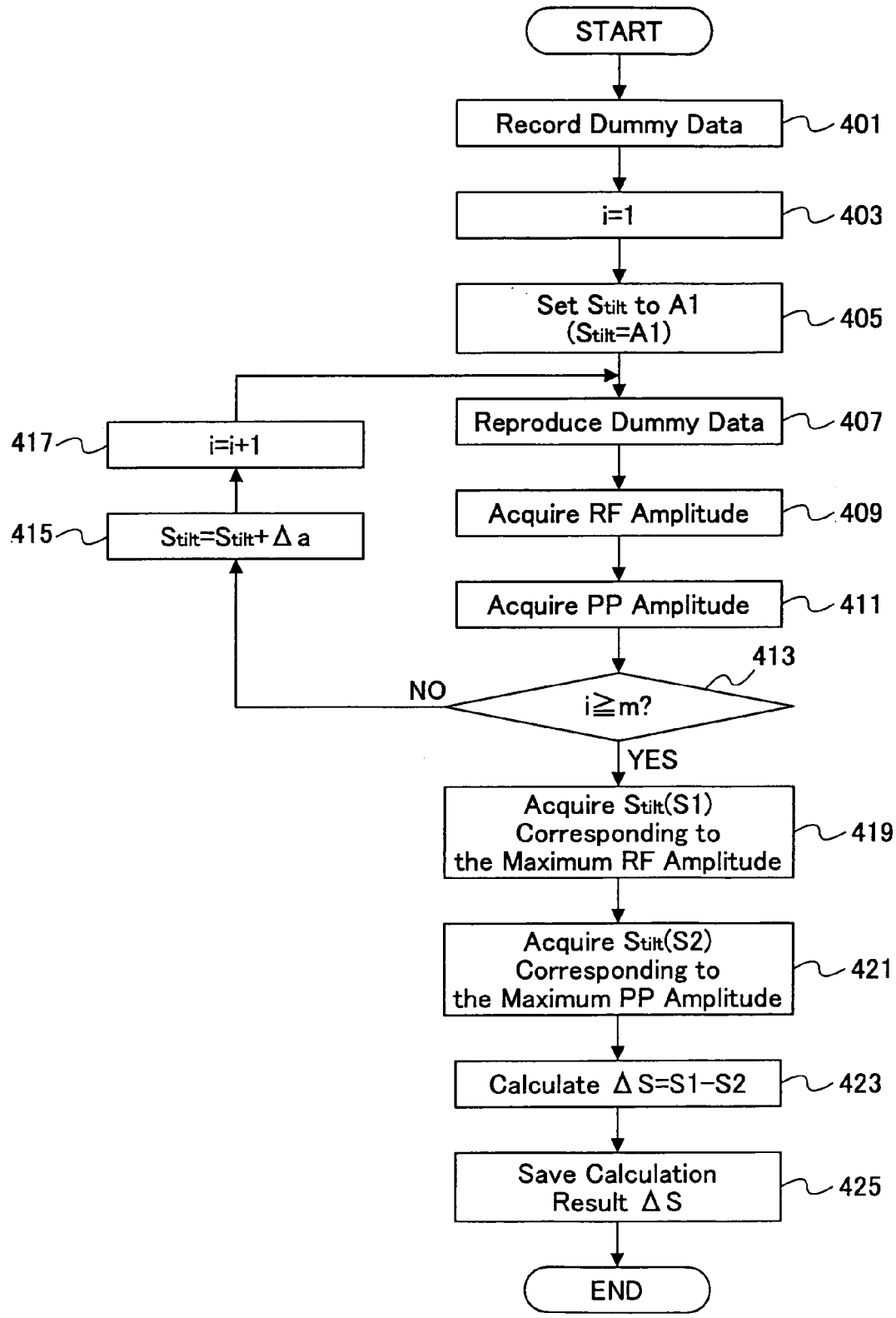
FIG. 6 is a flowchart of the operation for acquiring tilt difference information.

In step 465, the optimum tilt control signal S is calculated based on equation (2).

$$S = \Delta S + S3, \quad (2)$$

where ΔS is the tilt difference information acquired in the process shown in FIG. 6.

In step 467, the optimum tilt control signal S is output to the motor driver 27, and the CPU 40 exits from this sub routine.

Consequently, the motor driver 27 outputs a tilt driving current, which corresponds to the optimum tilt control signal S, to the optical pickup device 23. Based on the tilt driving current, the object lens 60 is pivoted in the X-Z plane to correct the tilt.

When this tilt correction is finished, the CPU 40 reports the completion of tilt correction to the encoder 25. Then, the user data are written in the optical disk 15 via the encoder 25, the laser control circuit 24, and the optical pickup device 23. When all the user data are written, the optical disk apparatus 20 finishes the recording operation.

Next, the reproducing operation of the optical disk apparatus 20 for reproducing data from the optical disk 15 is explained.

In response to a reproducing command supplied from the host apparatus, the CPU 40 outputs a control signal to the motor driver 27 to control the rotation of the spindle motor 22 based on a designated reproduction rate. At the same time, the CPU 40 reports the receipt of the reproducing command from the host to the reproduced signal processing circuit 28. The CPU 40 also instructs the buffer manager 37 to store the user data supplied from the host in buffer RAM 34.

When rotation of the optical disk 15 has reached a prescribed linear velocity, track error and focus error are corrected, as in the recording operation. Track error correction and the focus error correction are performed whenever necessary until the reproduction process is completed.

The CPU 40 outputs a seek control signal to the motor driver 27, based on the ADIP information output from the reproduced signal processing circuit 28 at prescribed timing.

When the optical pickup device 23 has reached the reading start position, the CPU 40 carries out tilt correction, as has been described above. When the tilt correction is finished, the CPU 40 reports the completion of tilt correction to the reproduced signal processing circuit 28. Then, the reproduced signal processing circuit 28 detects an RF signal from the output of the photodetector 59, and stores the RF signal as reproduced data in the buffer RAM 34 after the decoding and error correction processes. When the reproduced data accumulated in the buffer RAM 34 reaches a predetermined amount for constituting sector data, the buffer manager 37 outputs the reproduced data to the host apparatus via the interface 38.

In the embodiment, the CPU 40 and the program executed by the CPU 40 used in the optical disk apparatus implement a tilt correction apparatus, a processor, and tilt difference information acquiring means. To be more precise, tilt difference information acquiring means is implemented by the process illustrated by the flowchart shown in FIG. 6, and a tilt correction apparatus is implemented by the process illustrated by the flowchart shown in FIG. 8. However, the present invention is not limited to these examples. A part or all of the process defined by the program executed by the CPU 40 may be replaced by a hardware structure.

Steps 451 through 463 correspond to the step of acquiring first information (or a tilt control signal S3) about the inclination of the object lens corresponding to the maximum PP amplitude. Step S465 corresponds to the step of acquiring second information (or the optimum tilt control signal S) representing the optimum inclination of the object lens in the target access area, based on the first information (i.e., the tilt control signal S3) and tilt difference information $\Delta s$.

The driving mechanism, such as the motor driver 27, corrects the inclination of the object lens based on the optimum tilt control signal S.

With this optical disk apparatus, when the optical pickup device 23 has moved to a writing start position in response to a recording command from the host apparatus, the CPU 40 carries out tilt correction. In the tilt correction, a tilt control signal (S3) obtained when the amplitude of the push-pull signal becomes the maximum is estimated. Then, the optimum tilt control signal at the writing position is calculated by adding a tilt difference stored in the flash memory 39 or RAM 41 to the estimated tilt control signal (S3). The tilt difference stored in the memory is the difference between a tilt control signal (S1) obtained when the amplitude of the RF signal becomes the maximum in a test area and a tilt control signal (S2) obtained when the amplitude of the push-pull signal becomes the maximum in the test area.

In this manner, from the measuring result of the push-pull signal in the writing target area, information about the optimum inclination of the object lens for the writing target area can be estimated precisely. Even for a non-recorded area (or a blank area) from which no reproduced signals can be acquired, the inclination of the object lens relative to the optical disk can be corrected precisely.

Because of the precise correction for the inclination of the object lens conducted prior to recording and reproducing data, stable and reliable recording and reproducing operations can be performed in the optical disk apparatus.

Although in the embodiment the tilt difference information is acquired automatically when the optical disk 15 is loaded in the optical disk apparatus, the tilt difference may be acquired when a request is received at the optical disk apparatus from the host. Alternatively, the tilt difference may be acquired during at least one of the manufacturing process, the adjusting process, and the test process of the optical disk apparatus. In this case, the obtained tilt difference is saved in the flash memory 39. The tilt difference information may be stored together with information about what type of optical disk is used so as to allow the optical disk apparatus to perform appropriate tilt correction according to the type of the optical disk.

Although in the embodiment a blank disk is used to acquire tilt difference information in advance, an optical disk with recorded data may be used. In this case, the step of recording dummy data (step 401) is not required, and recorded data are reproduced in step 407.

Figure 9:
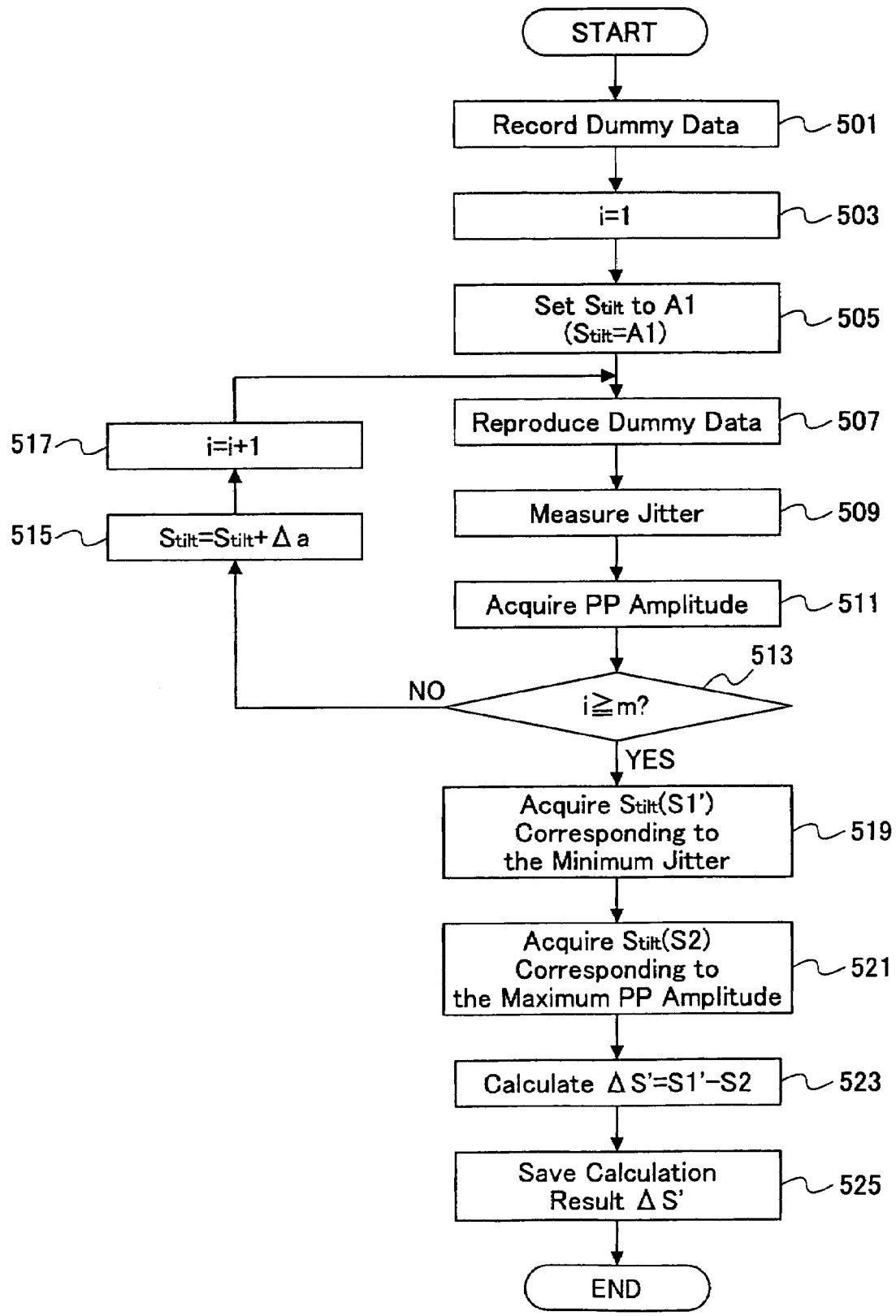
FIG. 9 is a flowchart of the operation for acquiring tilt difference information using jitter, in place of the RF signal amplitude used in the operation flow shown in FIG. 6.
Figure 10A:
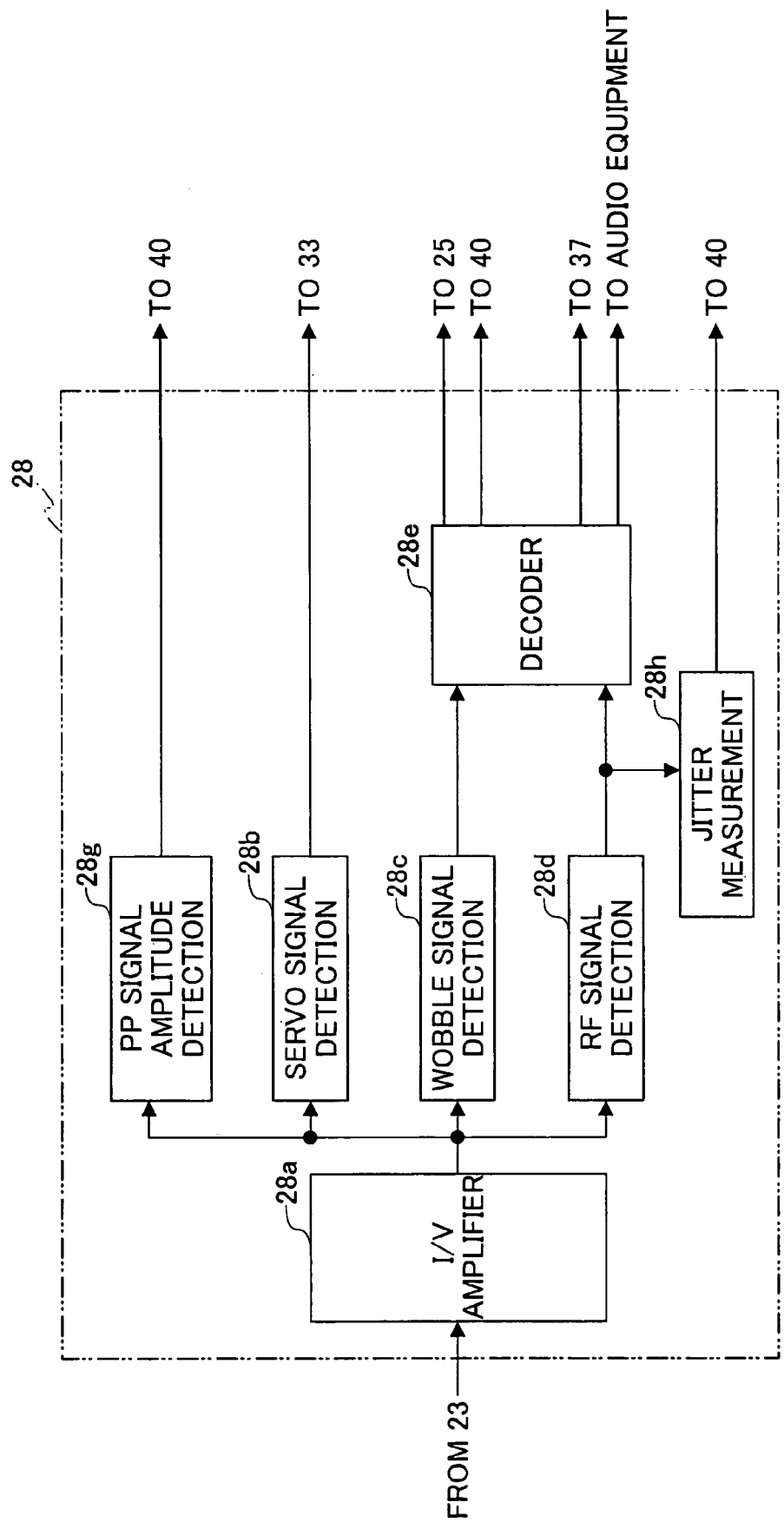
FIG. 10A is a block diagram of the reproduce signal processing circuit used when jitter is used to acquire the tilt difference information.

In the above-described embodiment, tilt difference information is acquired making use of the relation between the amplitude of the RF signal and the corresponding tilt control signal. However, the invention is not limited to this example. For example, the tilt difference information may be acquired making use of the relation between jitter and the tilt control signal. The operational flow using jitter information is illustrated in FIG. 9. In this case, a jitter measuring circuit 28h is connected to the output of the RF signal detection circuit 28d, in place of the RF amplitude detection circuit 28f, in the reproduced signal processing circuit 28, as illustrated in FIG. 10A. The jitter measuring circuit 28h measures jitter based on the RF signal detected by the RF signal detection circuit 28d, and outputs the measured result to the CPU 40.

Referring to FIG. 9, steps 501 through 507, which are the same as steps 401 through 407 shown in the operation flow of FIG. 6, are carried out.

Then, in step 509, jitter is acquired by the jitter measuring circuit 28h, and the measured jitter is saved in the RAM 41 in association with the corresponding tilt control signal $S_{tilt}$. In step 511, the amplitude of the push-pull signal (i.e., PP amplitude) is acquired, as in step 411.

In step 513, it is determined whether the loop counter value "i" is greater than or equal to m. Since at the beginning of the iteration the "i" value is set to 1, the determination result in step 513 is negative, and the process proceeds to step 515, in which the tilt control signal $S_{tilt}$ is updated by the prescribed step size $\Delta a$ ($S_{tilt}=S_{tilt}+\Delta a$). In step 517, the loop counter is incremented. Steps 515 and 517 are the same as steps 415 and 417.

When the counter value "i" has reaches m or greater, the determination result of step 513 becomes positive, and the process proceeds to step 519.

Figure 10B:
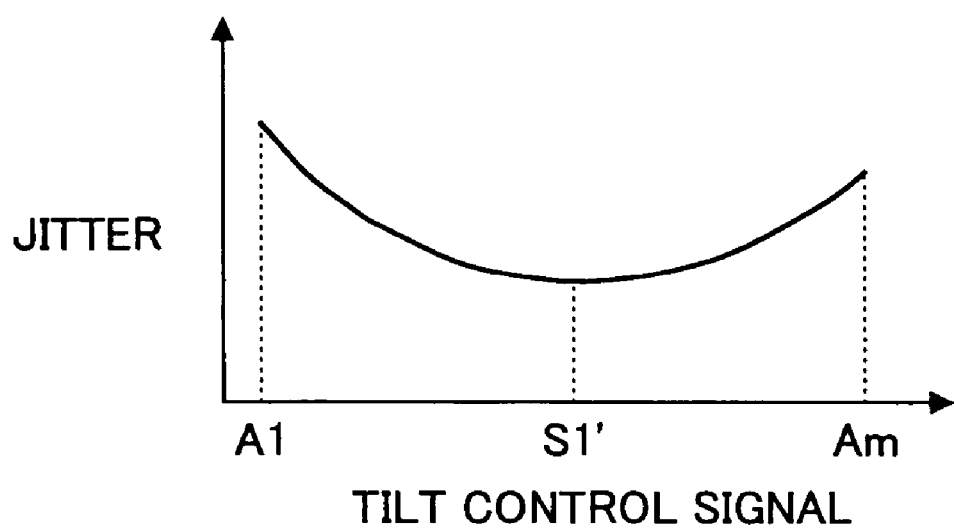
FIG. 10B is a graph of jitter as a function of tilt control signal level.

In step 519, a tilt control signal (S1') that corresponds to the minimum of the jitter is acquired, based on the relation between the measured jitter and the corresponding tilt control signal $S_{tilt}$ stored in the RAM 41, as illustrated in FIG. 10B.

In step 521, a tilt control signal (S2) that corresponds to the maximum of the PP amplitude is acquired, as in step 421. Then, in step 523, a tilt difference $\Delta s'$ between the tilt control signal S1' corresponding to the minimum jitter and the tilt control signal S2 corresponding to the maximum PP amplitude is calculated based on equation (3).

$$\Delta S = S1' - S2. \tag{3}$$

In step 525, the calculation result ΔS' is saved in the flash memory 39 or the RAM 41, and the process terminates.

When using the jitter information, the optimum tilt control signal S is estimated using equation (4) in place of equation (2).

$$S = \Delta S' + S3. \tag{4}$$

Figure 11A:
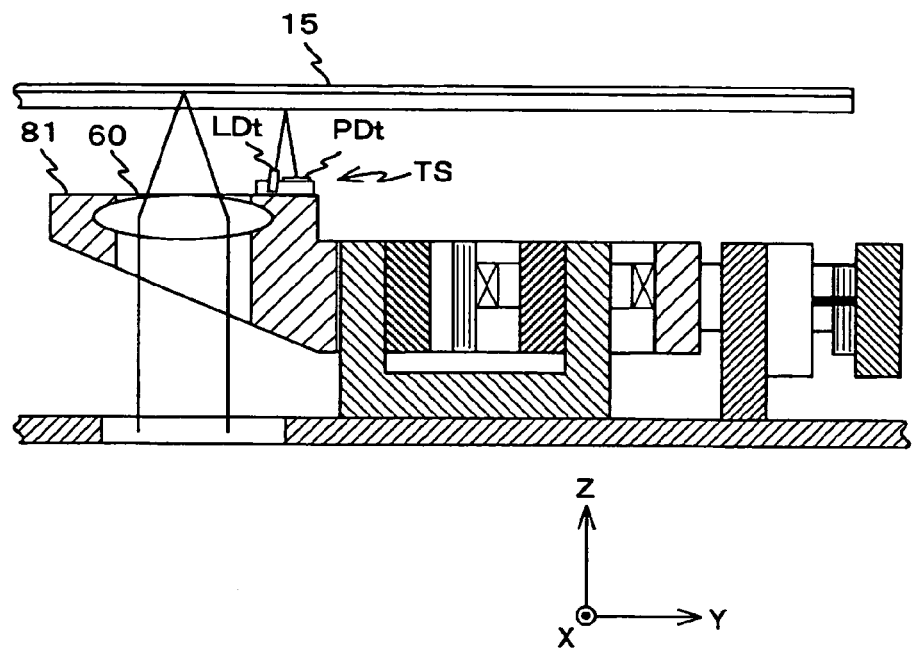
FIG. 11A is a cross-sectional view illustrating a condensing optical system having a tilt sensor.
Figure 11B:
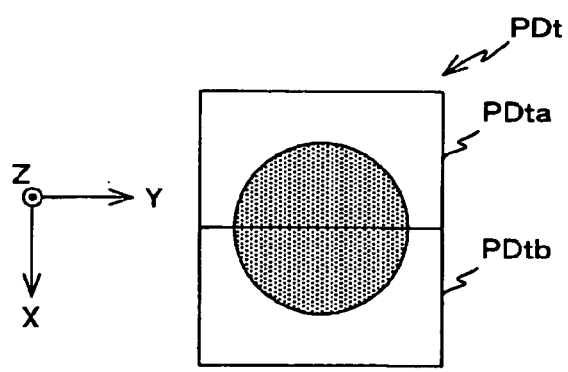
FIG. 11B illustrates a halved light receiving element used for the tilt sensor.

In the above-described embodiment, a tilt sensor TS for measuring the inclination of the object lens 60 relative to the optical disk 15 may be provided to the lens holder 81, as illustrated in FIG. 11A. The tilt sensor TS includes a semiconductor laser LDt for emitting a tilt detection laser beam to the optical disk 15, and a halved light receiving element PDt that receives the tilt detection laser beam reflected from the optical disk 15. FIG. 11B illustrates an example of the halved light receiving element PCt, which is designed such that the output from the first half PDta and the output from the second half PDtb differ from each other according to the inclination of the object lens 60 relative to the optical disk 15. A signal representing the difference between the outputs of PDta and PDtb, which is referred to as a "tilt sensor signal" for convenience, is converted to a digital signal, and output to the CPU 40.

Figure 12:
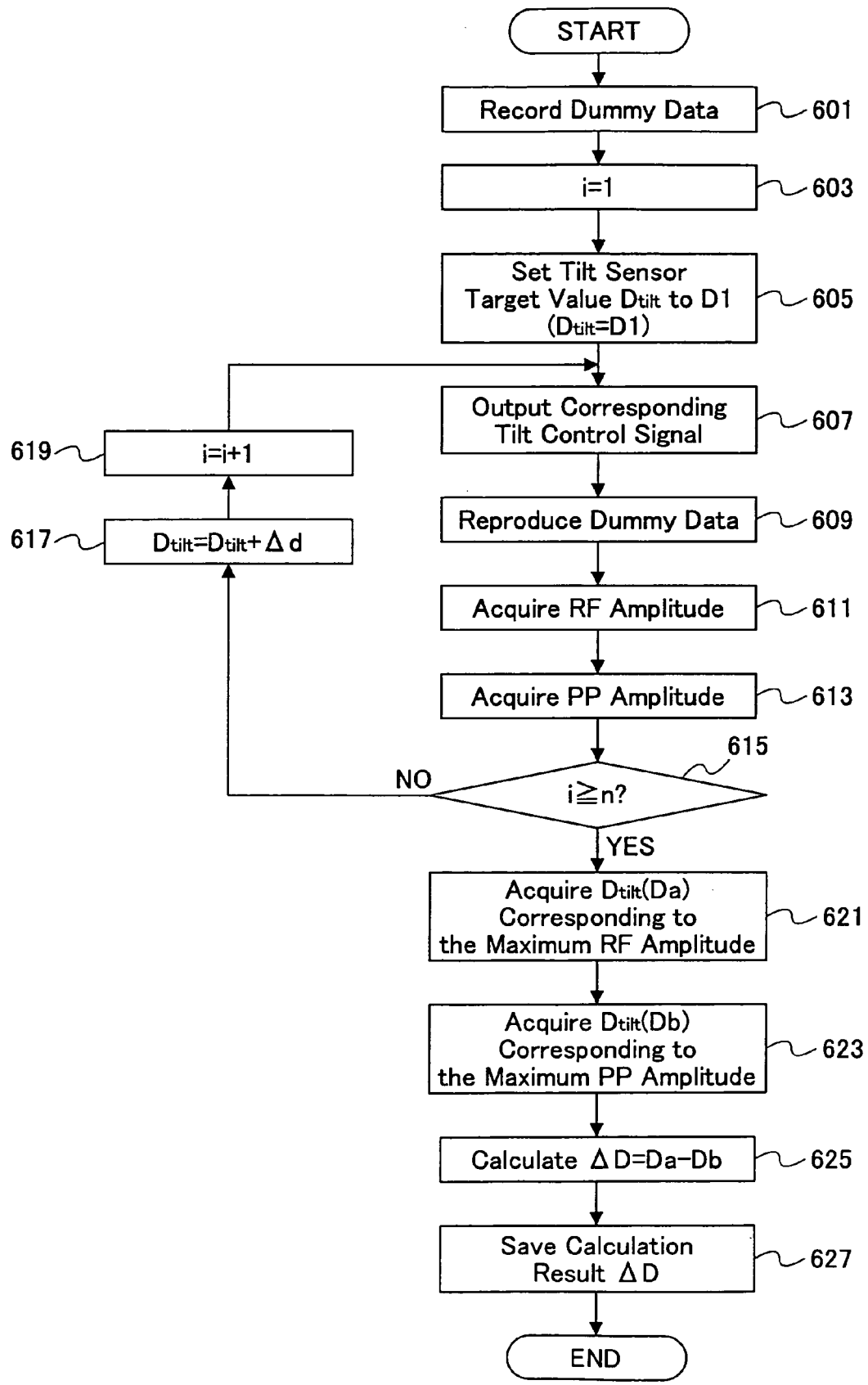
FIG. 12 is a flowchart of the operation for acquiring tilt difference information using a tilt sensor.

FIG. 12 illustrates an operational flow using the tilt sensor signal to acquire tilt difference information. Steps 601 through 603 are the same as steps 401 through 403 shown in FIG. 6.

In step 605, the tilt sensor target value (referred to as the "tilt target value") $D_{tilt}$ is set to the initial value D1. In this example, the tilt target value $D_{tilt}$ is varied from D1 to Dn (Dn=D1+(n-a)*Δd, n≧2) by step size Δd over a range across a prescribed reference.

In step 607, the tilt control signal is adjusted so that the tilt sensor signal becomes the tilt target value $D_{tilt}$, and the adjusted tilt control signal is output to the motor driver 27. The motor driver 27 outputs a tilt driving current corresponding to the tilt control signal to the optical pickup device 23.

In step 609, the dummy data are reproduced, as in step 407. In step 611, RF amplitude is detected as in step 409, and the detected RF amplitude is saved in the RAM 41 in association with the corresponding tilt target value $D_{tilt}$. Similarly, in step 613, PP amplitude is detected as in step 411, and the detected PP amplitude is saved in the RAM 41 in association with the corresponding tilt target value $D_{tilt}$.

In step 615, it is determined whether the loop counter value "i" is greater than or equal to n. Since at the beginning of the iteration the "i" value is set to 1, the determination result in step 615 is negative, and the process proceeds to step 617, in which the current tilt target value $D_{tilt}$ is updated by the prescribed step size Δd ($D_{tilt}=D_{tilt}+d$). In step 619, the loop counter is incremented, and the process returns to step 607. Steps 607 through 619 are repeated until the loop counter value "i" reaches n or greater.

When the counter value "i" has reaches n or greater, the determination result of step 615 becomes positive, and the process proceeds to step 621.

In step 621, a tilt target value $D_{tilt}$ (Da) that corresponds to the maximum of the RF amplitude is acquired, based on the relation between the RF amplitude and the tilt target value $D_{tilt}$ stored in the RAM 41.

In step 623, a tilt target value $D_{tilt}$ (Db) that corresponds to the maximum of the PP amplitude is acquired. Then, in step 625, a tilt difference ΔD between the tilt target value (Da) corresponding to the maximum RF amplitude and the tilt target value (Db) corresponding to the maximum PP amplitude is calculated based on equation (5).

$$\Delta D = Da - Db. \tag{5}$$

In step 627, the calculation result ΔD is saved in the flash memory 39 or the RAM 41, and the process terminates.

Figure 13:
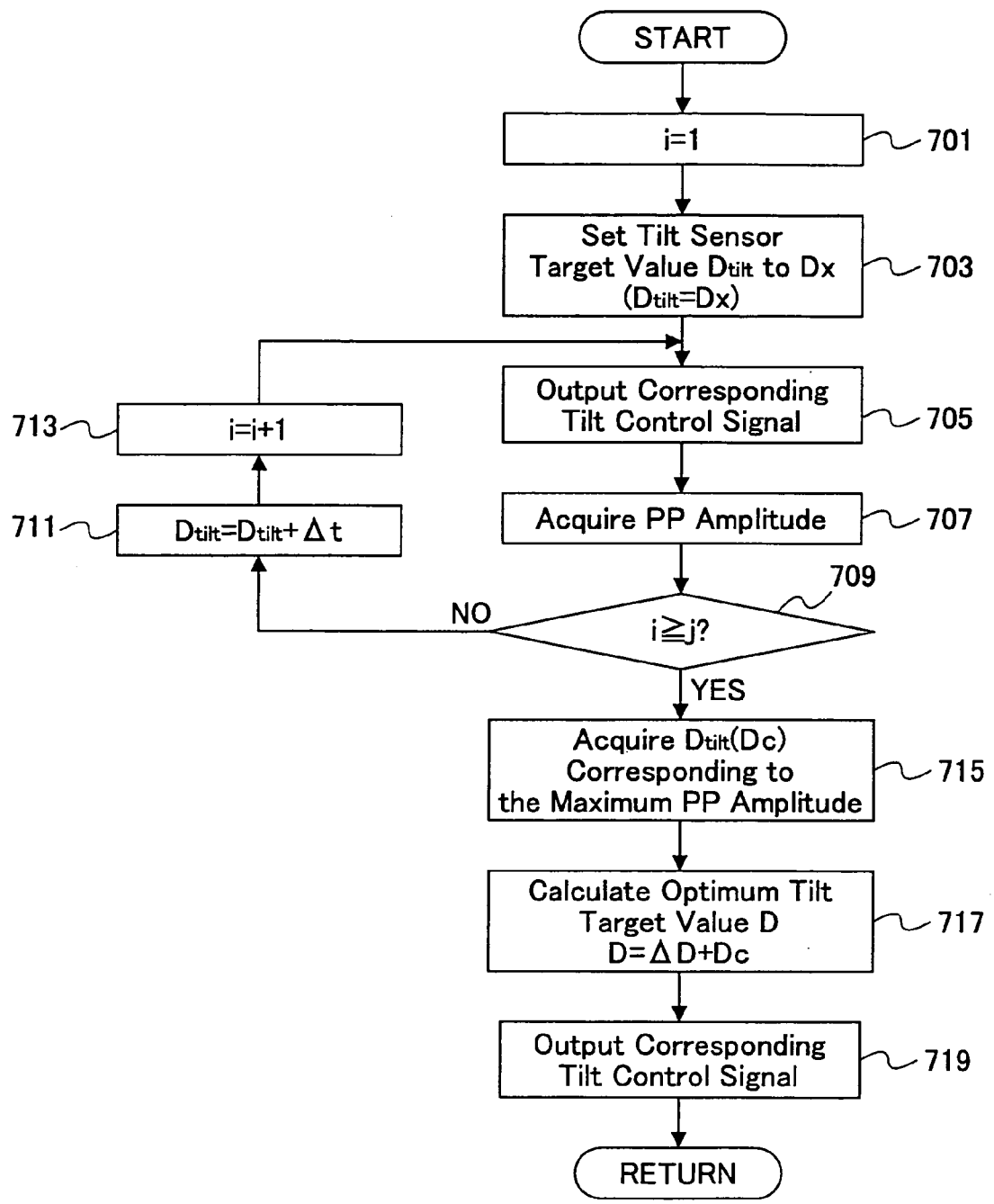
FIG. 13 is a flowchart of the operation for tilt correction using the tilt sensor.

FIG. 13 is a flowchart showing the tilt correction operation using the tilt difference information ΔD calculated in step 625 in FIG. 12.

First, in step 701, the loop counter value "i" is set to the initial value "1". In step 703, tilt target value $D_{tilt}$ is set to the initial value Dx. In this example, the tilt target value $D_{tilt}$ is varied from the initial value Dx to Dj by a stepsize of Δt (Dj=Dx+(j-1)*Δt, j≧2) over a range across a prescribed reference.

Then, in step 705, tilt control signal is adjusted so that the tilt sensor signal becomes the tilt target value $D_{tilt}$, and the adjusted tilt control signal is output to the motor driver 27.

In step 707, the amplitude of a push-pull signal (i.e., PP amplitude) is detected by the PP amplitude detection circuit 28g, and is saved in the RAM 41 in association with the corresponding tilt target value $D_{tilt}$.

In step 709, it is determined whether the loop counter value "i" is greater than or equal to j. Since loop counter value "i" has been set to "1", the determination result in step 709 is negative and the process proceeds to step 711, in which the current tilt target value $D_{tilt}$ is updated by adding Δt ($D_{tilt}=D_{tilt}+\Delta t$). Then, the loop counter is incremented by 1, and the process returns to step 705. Steps 705 through 713 are repeated until the loop counter value "i" becomes j or greater. When the loop counter value reaches j, the determination result in step 709 becomes positive, and the process proceeds to step 715.

In step 715, a tilt target value (Dc) that corresponds to the maximum of the PP amplitude is acquired, based on the relation between the detected PP amplitude and the associated tilt target value stored in the RAM 41.

In step 717, the optimum tilt target value D is calculated based on equation (6).

$$D = \Delta D + Dc. \tag{6}$$

In step 719, a tilt control signal that corresponds to this optimum tilt target value D is output to the motor driver 27, and the CPU 40 exits from this sub routine.

When acquiring the tilt difference information in the operation flow of FIG. 12, jitter may be used in step 611 in place of RF amplitude.

Although in the embodiment two tracking coils are used to drive the object lens 60 in the tracking direction, the invention is not limited to this example. Similarly, although in the embodiment a single focusing coil is used to drive the object lens to the focusing direction, the invention is not limited to this example.

In the embodiment, two tilt coils are used to rotate the object lens 60 in the X-Z plane; however, the invention is not limited to this example, and for instance, a tilt motor may be used to rotate the pickup core 101 within the X-Z plane. In general, the amount of tilt correction for the object lens is small, and therefore, a cam mechanism may be provided to the rotational shaft of the tilt motor to cause the object lens to incline along with the cam rotation. In this case, the inclination of the object lens can be controlled by the rotation angle of the tilt motor.

In the above-described embodiment, tilt correction is started when the optical pickup device 23 has reached the wiring starting position, prior to the data recording operation. However, tilt correction may be started when the optical pickup device 23 has reaches the vicinity of the writing staring position. Similarly, in the reproducing operation, tilt correction may be started when the optical pickup device has reached the vicinity of the reading start position.

Acquired tilt difference information may be saved in the flash memory 39 or the RAM 41 in association with the information representing the type of the optical disk. With this arrangement, tilt correction can be performed using appropriate tilt difference information depending on the type of optical disk.

In the process for acquiring the tilt difference information, a tilt control signal obtained when the offset component of the push-pull signal becomes substantially zero may be used in place of the tilt control signal obtained when the PP amplitude becomes substantially the maximum. In this case, when correcting the inclination of the object lens using this tilt difference information, a tile control signal is obtained when the offset component of the push-pull signal becomes substantially zero, in place of the PP amplitude, prior to estimating the optimum tilt control signal.

Although in the embodiment the information recording medium is based on the DVD standard, other types of information recording media based on, for example, the CD standard may be used.

In the embodiment, the optical pickup device uses a single semiconductor laser. The invention is not limited to this example and multiple semiconductor lasers with different wavelengths may be used. In this case, at least one of the wavelengths of 405 nm, 660 nm, and 780 nm is used.

In the embodiment, the optical disk apparatus is capable of recording and reproduction of information. However, the optical disk apparatus may perform at least a recording operation among recording, reproducing, and erasing operations.

As has been described above, with the tilt correction technique of the present invention, the inclination of the object lens can be corrected precisely even in the area in which not data have been recorded.

In addition, with the optical disk apparatus having the above-described tilt correction function, stable and reliable access to the information recording medium can be achieved.

This patent application is based on and claims the benefit of the earlier filing date of Japanese Patent Application No. 2003-024159 filed Jan. 31, 2003, the entire contents of which are hereby incorporated by reference.

The invention claimed is:

1. A tilt correction method for correcting an inclination of an object lens relative to an information recording medium in an optical disk apparatus, the object lens being used to concentrate a light beam onto a recording side of the information recording medium and collect a reflected beam from the recording side, the method comprising the steps of:
    acquiring first information about a specific inclination of the object lens in response to an access request to the information recording medium, the specific inclination corresponding to one obtained when a signal characteristic of a push-pull signal extracted for track error detection from the reflected beam becomes a prescribed level in or near a target access area;
    acquiring second information about the optimum inclination of the object lens for the target access area, based on the first information and tilt difference information representing a difference between a first inclination and a second inclination of the object lens defined in advance in a particular area on the information recording medium, the first inclination corresponding to an optimum reproduced signal from said particular area, and the second inclination being obtained when the signal characteristic of the push-pull signal from said particular area becomes said prescribed level; and
    acquiring tilt correction information for correcting the inclination of the object lens based on the second information.

2. The method of claim 1, wherein the signal characteristic of the push-pull signal is the amplitude, and said specific inclination and the second inclination are obtained when the amplitude of the push-pull signal becomes substantially the maximum.

3. The method of claim 1, wherein the first inclination is obtained when amplitude of an RF signal becomes substantially the maximum during reproduction of data from said particular area.

4. The method of claim 1, wherein the first inclination is obtained when jitter becomes substantially the minimum during reproduction of data from said particular area.

5. The method of claim 1, further comprising the step of adjusting the inclination of the object lens based on the tilt correction information.

6. A tilt correcting apparatus for correcting an inclination of an object lens relative to an information recording medium for at least a recording operation of recording information in a recording side of the information recording medium using a light beam, the apparatus comprising:
    first means for acquiring first information about a specific inclination of the object lens in response to an access request to the information recording medium, the specific inclination corresponding to one obtained when a signal characteristic of a push-pull signal extracted for track error detection from the light beam reflected from the recording side and collected through the object lens becomes a prescribed level in or near a target access area;
    second means for acquiring second information about the optimum inclination of the object lens for the target access area, based on the first information and tilt difference information representing a difference between a first inclination and a second inclination of the object lens defined in advance in a particular area on the information recording medium, the first inclination corresponding to an optimum reproduced signal from said particular area, and the second inclination being obtained when the signal characteristic of the push-pull signal from said particular area becomes said prescribed level; and
    third means for correcting the inclination of the object lens based on the second information.

7. The apparatus of claim 6, wherein the first means acquires the specific inclination when the amplitude of the push-pull signal becomes substantially the maximum in the target access area.

8. The method of claim 6, wherein the second means acquires the first inclination when amplitude of an RF signal becomes substantially the maximum during reproduction of data from said particular area, and acquires the second inclination when the amplitude of the push-pull signal becomes substantially the maximum in said particular area.

9. The apparatus of claim 6, wherein the first inclination is one obtained when jitter becomes substantially the minimum during reproduction of data in said particular area.

10. An optical disk apparatus comprising:
    a light source;

an optical system including an object lens configured to guide light flux emitted from the light source onto a recording side of an information recording medium through the object lens and to guide return light flux reflected from the recording side to a prescribed light receiving position;

a photodetector located at the light receiving position;

a controller that controls at least a recording operation for recording information in the information recording medium based on an output signal from the photodetector; and a tilt correction device that corrects the inclination of the object lens relative to the information recording medium for at least said recording operation, the tilt correction device including:

first means for acquiring first information about a specific inclination of the object lens in response to an access request, the specific inclination being obtained when the signal characteristic of a push-pull signal extracted for track error detection from the return light flux becomes a prescribed level in an area including at least the vicinity of a target access area on the recording side;

second means for acquiring second information about the optimum inclination of the object lens for the target access area, based on the first information and tilt difference information representing a difference between a first inclination and a second inclination of the object lens defined in advance in a particular area on the information recording medium, the first inclination corresponding to an optimum reproduced signal from said particular area, and the second inclination being obtained when the signal characteristic of the push-pull signal from said particular area becomes said prescribed level; and third means for correcting the inclination of the object lens based on the second information.

11. The optical disk apparatus of claim 10, further comprising a tilt information acquiring means that acquires the tilt difference information based on the output signal from the photodetector.

12. The optical disk apparatus of claim 11, wherein the tilt difference information acquiring means causes prescribed dummy data to be recorded in at least a portion of the recording side of the information recording medium, prior to acquiring the tilt difference information when no data are recorded on the recording side of the information recording medium.

13. The optical disk apparatus of claim 10, further comprising a memory for storing the tilt difference information.

14. The optical disk apparatus of claim 10, wherein the tilt difference acquiring means acquires the tilt difference information during at least one of the manufacturing process and the adjusting process of the optical disk apparatus.

* * * * *